US010310922B2

(12) United States Patent
Huang

(10) Patent No.: US 10,310,922 B2
(45) Date of Patent: Jun. 4, 2019

(54) SYSTEMS AND METHODS FOR PREDICTING AND IMPROVING SCANNING GEOMETRIC ACCURACY FOR 3D SCANNERS

(71) Applicant: University of Southern California, Los Angeles, CA (US)

(72) Inventor: Qiang Huang, Rancho Palos Verdes, CA (US)

(73) Assignee: University of Southern California, Los Angeles, CA (US)

( * ) Notice: Subject to any disclaimer, the term of this patent is extended or adjusted under 35 U.S.C. 154(b) by 419 days.

(21) Appl. No.: 15/098,267

(22) Filed: Apr. 13, 2016

(65) Prior Publication Data

US 2016/0299996 A1 Oct. 13, 2016

Related U.S. Application Data

(60) Provisional application No. 62/146,659, filed on Apr. 13, 2015, provisional application No. 62/154,178, filed on Apr. 29, 2015.

(51) Int. Cl.
| G06F 17/50 | (2006.01) |
| G06F 11/07 | (2006.01) |
| H04N 1/00 | (2006.01) |
| H04N 13/00 | (2018.01) |

(52) U.S. Cl.
CPC ......... *G06F 11/0721* (2013.01); *H04N 1/00* (2013.01); *H04N 13/00* (2013.01)

(58) Field of Classification Search
USPC ......................................................... 703/1
See application file for complete search history.

(56) References Cited

U.S. PATENT DOCUMENTS

| 2012/0290259 A1* | 11/2012 | McAfee ............... G01B 11/24 |
| | | 702/155 |
| 2013/0268085 A1 | 10/2013 | Dong |
| 2014/0107823 A1* | 4/2014 | Huang ................. G06F 17/50 |
| | | 700/98 |

(Continued)

OTHER PUBLICATIONS

Campanelli et al., "Statistical analysis of the stereolithographic process to improve the accuracy", Computer Aided Design 39:80-86, 2007.

(Continued)

*Primary Examiner* — Timothy A Mudrick
(74) *Attorney, Agent, or Firm* — Fish & Richardson P.C.

(57) ABSTRACT

Methods, systems, and apparatus including medium-encoded computer program products for generating and visualizing 3D scenes include, in one aspect, a method including: obtaining data regarding (i) standard calibration parts with shapes comprising a cylinder and polyhedrons, and (ii) a limited number of scanning trials performed on the standard calibration parts using a three dimensional (3D) scanner; comparing the data to find shape deviations for the standard calibration parts in a coordinate system; generating a model of functional dependence of scanning error for the 3D scanner using the shape deviations; and providing the model of functional dependence of scanning error for the 3D scanner to quantify scanning inaccuracy of the 3D scanner, wherein the model is usable to predict a measurement error for the 3D scanner on a scanned product.

17 Claims, 5 Drawing Sheets

(56) References Cited

U.S. PATENT DOCUMENTS

| | | | |
|---|---|---|---|
| 2014/0320408 A1* | 10/2014 | Zagorsek | G06F 3/017 345/158 |
| 2015/0057982 A1 | 2/2015 | Erdman | |
| 2016/0046076 A1 | 2/2016 | Huang et al. | |
| 2016/0299996 A1 | 10/2016 | Huang | |
| 2016/0320771 A1 | 11/2016 | Huang | |
| 2017/0072631 A1 | 3/2017 | Gallucci | |

OTHER PUBLICATIONS

Cho et al., "A dithering algorithm for local composition control with three-dimensional printing", Computer-Aided Design 35:851-867, 2003.

Cohen, "Geometric feedback control of discrete-deposition SFF systems", Rapid Prototyping Journal 16/5:377-393, 2010.

Huang et al., "Optimal offline compensation of shape shrinkage for three-dimensional printing process", IIE Transactions 47:1-11, 2015.

Huang, "An Analytical Foundation for Optimal Compensation of Three-Dimensional Shape Deformation in Additive Manufacturing"; J. Manuf. Sci. Eng 138(6), 061010 (Jan. 12, 2016).

Huang et al., "Statistical Predictive Modeling and Compensation of Geometric Deviations of Three-Dimensional Printed Products", Journal of Manufacturing Science and Engineering 136(061008):1-10, Dec. 2014.

Huang et al., "CAD/CAE/CAM integration for increasing the accuracy of mask rapid prototyping system", Computers in Industry 56 (2005) 442-456.

Jin et al., "Out-of-Plane Geometric Error Prediction for Additive Manufacturing", IEEE International Conference on Automation Science and Engineering (CASE), Aug. 2015.

Jin et al., "Three-Dimensional Geometric Error Prediction for Additive Manufacturing", IEEE International Conference on Automation Science and Engineering (CASE), 2015.

King et al., "Laser powder bed fusion additive manufacturing of metals; physics, computational, and materials challenges", Applied Physics Reviews 2(041304):1-26, 2015.

Luan et al., "General Predictive Modeling of Geometric Deviations of Freeform 3D Printed Products", IEEE International Conference on Automation Science and Engineering (CASE), 2015.

Luan et al., "Predictive Modeling of In-Plane Geometric Deviation for 3D Printed Freeform Products", IEEE International Conference on Automation Science and Engineering (CASE), 2015.

Luan et al., "Predicting In-plane Error for Freeform Products", IEEE International Conference on Automation Science and Engineering (CASE), 2015.

Lynn-Charney and Rosen, "Usage of accuracy models in sterolithography process planning", Rapid Prototyping Journal 6(2):77-86, 2000.

Masood et al., "Part Build Orientations Based on Volumetric Error in Fused Deposition Modelling", Int. J. Adv. Manuf. Technol. (2000) 16:162-168.

Secondi, "Modelling powder compaction from a pressure-density law to continuum", Powder Meallurgy 45(3):213-217, 2002.

Sood et al., "Improving dimensional accuracy of fused deposition modelling processed part using grey Taguchi method", Materials and Design 30:4243-4252, 2009.

Storakers et al., "The viscoplastic compaction of composite powders", Journal of the Mechanics and Physics of Solids 47:785-815, 1999.

Tong et al., "Error Compensation for fused deposition modeling (FDM) machine by correcting slice files", Rapid Prototyping Journal 14/1 (2008) 4-14.

Tong et al., "Parametric error modeling and software error compensation for rapid prototyping", Rapid Prototyping Journal 9(5):301-313, 2003.

Wang, "Calibration of shrinkage and beam offset in SLS process", Rapid Prototyping Journal 5(3):139-133, 1999.

Weisstein, Eric W., "Spherical Coordinates", from MathWorld—A Wolfram Web Resource, http://mathworld.wolfram.com/SphericalCoordinates.html.

Zhou et al., "Parametric process optimization to improve the accuracy of rapid prototyped stereolithography parts", International Journal of Machine Tools and Manufacture 40:363-379, 2000.

Zhou, "A direct tool path planning algorithm for line scanning based stereolithography", Journal of Manufacturing Science and Engineering 136(061023):1-10, Dec. 2014.

U.S. Appl. No. 15/143,358, Office Action dated Aug. 23, 2018, 26 pages.

* cited by examiner

SYSTEMS AND METHODS FOR PREDICTING AND IMPROVING SCANNING GEOMETRIC ACCURACY FOR 3D SCANNERS

CROSS-REFERENCE TO RELATED APPLICATIONS

This application claims the benefit under 35 U.S.C. § 119(e) of U.S. Patent Application No. 62/146,659 entitled "ENABLE 3D SCANNERS AS INSPECTION TOOL THROUGH NOVEL PREDICTION OF SCANNING GEOMETRIC ACCURACY", filed Apr. 13, 2015, which is incorporated herein by reference in its entirety.

This application claims the benefit under 35 U.S.C. § 119(e) of U.S. Patent Application No. 62/154,178, entitled "OPTIMAL COMPENSATION ALGORITHM FOR THREE-DIMENSION SHAPE DEVIATIONS IN ADDITIVE MANUFACTURING", filed Apr. 29, 2015, which is incorporated herein by reference in its entirety.

This application is related to U.S. patent application Ser. No. 14/827,956, entitled "STATISTICAL PREDICTIVE MODELING AND COMPENSATION OF GEOMETRIC DEVIATIONS OF 3D PRINTED PRODUCTS", filed Aug. 17, 2015, now U.S. Patent Application Publication No. 2016/0046076, which is incorporated herein by reference in its entirety.

This application is related to U.S. patent application Ser. No. 14/052,418, entitled "3D PRINTING SHRINKAGE COMPENSATION USING RADIAL AND ANGULAR LAYER PERIMETER POINT INFORMATION", filed Oct. 11, 2013, now U.S. Patent Application Publication No. 2014/0107823, which is incorporated herein by reference in its entirety.

BACKGROUND

This specification relates to three dimensional (3D) scanning, including predicting geometric accuracy and compensating for measurement error for a 3D scanner.

Additive Manufacturing (AM), or 3D printing, is a technology that enables the direct fabrication of products that can include complex shapes and varying geometries. Existing 3D scanning technologies, for example laser triangulation 3D scanners, can experience various system errors (e.g., calibration errors, noise from lighting conditions) that may compromise the quality and/or accuracy associated with scans of the product. Geometric measurements and other inaccuracies related to the function of some 3D scanner devices can further affect the quality of digital models that are generated from scan data.

SUMMARY

This specification relates to 3D scanning, including predicting geometric accuracy and compensating for measurement error for a 3D scanner.

In general, one or more aspects of the subject matter described in this specification can be embodied in one or more methods that include: obtaining data regarding (i) standard calibration parts with shapes comprising a cylinder and polyhedrons, and (ii) a limited number of scanning trials performed on the standard calibration parts using a three dimensional (3D) scanner; comparing the data to find shape deviations for the standard calibration parts in a coordinate system; generating a model of functional dependence of scanning error for the 3D scanner using the shape deviations, wherein the model includes a first function base representing the shape deviations of cylindrical shape, and a second function representing a cookie-cutter model connecting the cylindrical shape with one or more other shapes; and providing the model of functional dependence of scanning error for the 3D scanner to quantify scanning inaccuracy of the 3D scanner, wherein the model is usable to predict a measurement error for the 3D scanner on a scanned product.

Particular embodiments of the subject matter described in this specification can be implemented to realize one or more of the following advantages. The systems and techniques described can predict the geometric discrepancies between scanned objects and digital images that can be experienced as a result of 3D scanning inaccuracies. The geometric prediction can be accomplished using modeling techniques of the embodiments, where the models represent errors in two-dimensional (2D) and 3D space for increased interoperability with 3D scanning environment. The systems and techniques described utilize an approach that leverages similarities in 3D scanning and 3D printing processes (e.g., digital modeling, 3D spatial considerations), so as to provide a more standardized solution that can be applicable to accuracy prediction and compensation in both environments (e.g., 3D printed product shrinkage and 3D scanner error). A predictive model can be established based on dedicated 3D scanning trials, which may eliminate the need for performing error measurements on newly scanned objects. The systems and techniques described can employ a scanning process which compensates for 3D scanner error, and thereby reduce or eliminate geometric discrepancy between the physical objects and their digital models. The 3D scanner compensation of the embodiments can increase the accuracy of digital models generated of scanned products, and thereby may eliminate the need for further modifying digital models using Computer Aided Design (CAD) software. The techniques and system described may improve the accuracy of 3D scanning processing, and thus can improve the reliability 3D scanning as a credible inspection tool for assessment of 3D printing quality, for example.

The details of one or more embodiments of the subject matter described in this specification are set forth in the accompanying drawings and the description below. Other features, aspects, and advantages of the invention will become apparent from the description, the drawings, and the claims.

DRAWING DESCRIPTIONS

Like reference numbers and designations in the various drawings indicate like elements.

DETAILED DESCRIPTION

Figure 1:
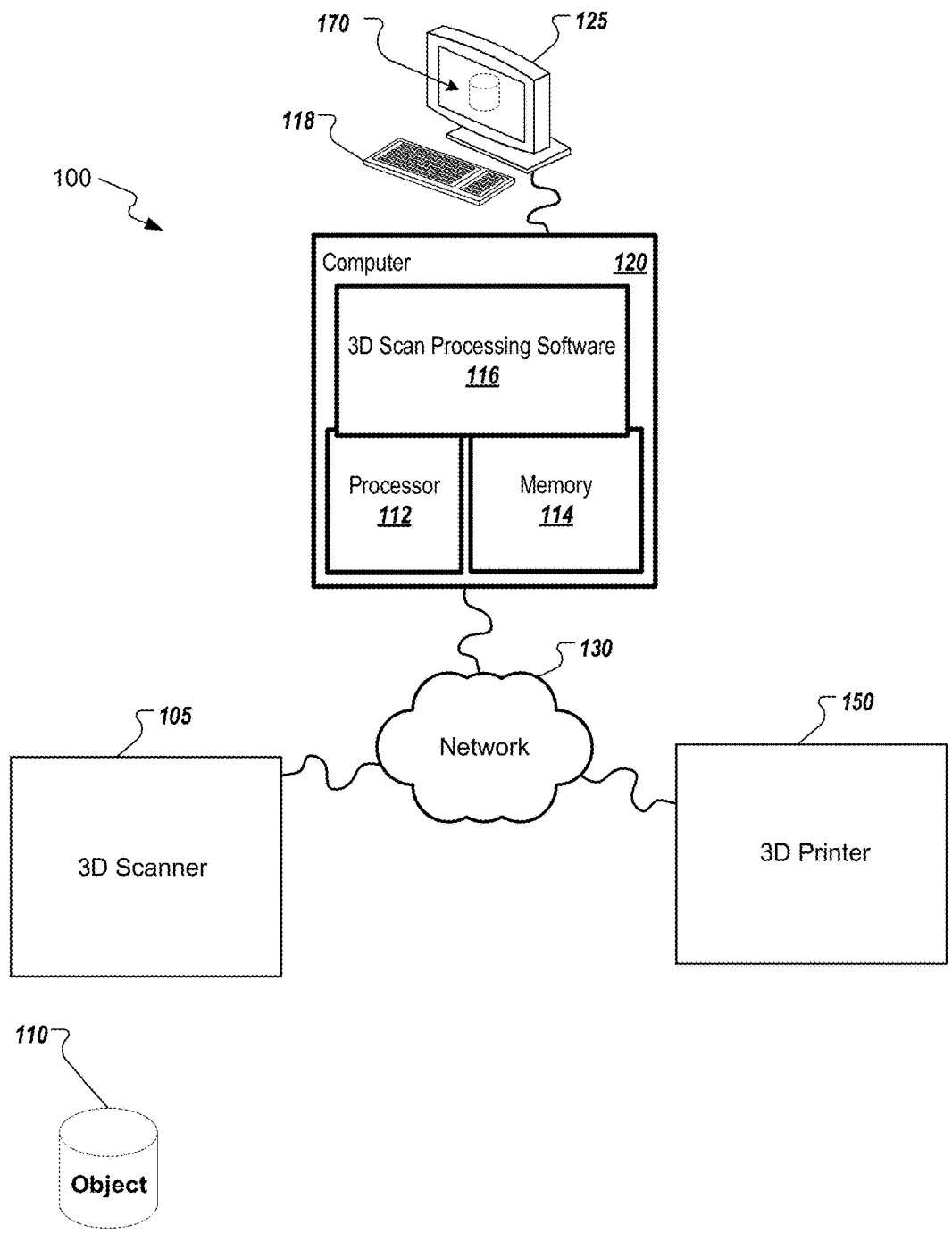
FIG. 1 shows an example of a system usable to generate a digital model of a physical object from 3D scans.

FIG. 1 shows an example of a system 100 usable to generate a digital model of a physical object from 3D scans. As shown in FIG. 1, the system includes a 3D scanner 105.

The 3D scanner 105 is employed to capture visual representations of a physical object 110. The 3D scanner 105 can include cameras or sensors employed to generate dense point clouds or polygon meshes used in 3D modeling. The 3D scanner 105 can be implemented using technology including but not limited to: 3D digitizers; laser scanners; structured light scanners; laser pulsed scanners; white light scanners; (Light Detection And Ranging) LIDAR; digital cameras; and structured light 3D cameras (e.g., the PrimeSense™ Kinect camera (available from Microsoft Corporation of Redmond, Wash.), for example. As an example, the system 100 can be employed to perform 3D printing as an application of 3D scanning. For instance, object 110 is scanned by 3D scanner 105 so as to generate scan data, including 2D visualizations (e.g., photographic images) and/or geometric measurements representing the physical surface of object 110. Object 110 is illustrated in FIG. 1 as a cylinder shaped product. In some implementations, object 110 can be a physical article consisting of differing geometric shapes. The scan data can be transmitted from 3D scanner 105 to computer 120, including 3D Scan Processing Software 116, which processes the received scan data to generate a digital model 170 of the scanned object 110. The digital model 170 can be a computer-generated 3D model, for example a 3D model that can be modified using CAD software. The digital model 170 can be further processed, using 3D Scan Processing Software, for example, to slice the digital model 170 into several cross sections according to a predesignated thickness for each layer, so that a 3D printer 150 can construct each layer sequentially. Each layer's construction can be analogous to printing of an image with a particular thickness, or volume. Therefore, after all layers have been printed by 3D printer 150, a printed product can be produced with the same dimensions as the digital model 170. It should be appreciated that the embodiments can be used to realize other applications of 3D scanning techniques in addition to 3D printing, such as digital archiving, reverse engineering, manufacturing, and inspection. The 3D printer 150 implements 3D printing using specific techniques associated with 3D printing, for example Stereolithography (SLA).

The 3D scanner 105 is configured to implement various approaches to 3D scanning that are based on imaging principles. For example, 3D scanner 105 can employ photogrammetry and/or light-based 3D scanning techniques for generating a visual representation of object 110. In some implementations, the 3D scanner is employed to take multiple 2D pictures of object 110. The 2D images can be captured from various positions, representing different perspectives, around the object 105. According to the embodiment, the 3D scanner 105 includes one or more cameras arranged at various angles about the object 110. Different viewpoints/camera angles associated with the 2D images captured by 3D scanner 105 can be employed to construct a 3D digital model from the scan data. Thereafter, the various 2D images can be fused, or otherwise combined, so as to generate a 3D mesh of the object.

In some implementations, the 3D scanner 105 is configured to transmit patterns of light, for example pulsed light, onto object 110. The edges of lines in the light pattern can be used to calculate a distance between the 3D scanner 105 and the surface of scanned object 110. Based on the deformations of the light patterns, a model form of the object can be determined and used to create a 3D mesh, or digital replica of object 110. Alternatively, 3D scanner 105 can include sensors used to measure various angles of reflected light laser which it can translate into coordinates of object 110 and therefore into a 3D mesh. In some implementations, the 3D scanner 105 scans object 105 using a laser, for example a laser line or a single laser point. According to this embodiment, 3D scanner 105 includes one or more sensors employed to detect the laser light that is reflected from object 110. Subsequently, the computer 120 can calculate a distance between object and the laser source of 3D scanner 105 using techniques such as triangulation. As a laser light from 3D scanner 105 is reflected from the scanned object 110, the 3D Scan processing Software 116 can be employed to calculate angles associated with the light detected by the sensors and, thereby determine various geometric measurements for the surface of object 110.

The computer 120 includes a processor 112 and a memory 114, and the computer 120 can be connected to a computer network 130, which can be a private network, a public network, a virtual private network, etc. The computer network 130 can be implemented as either a wired network (e.g., Ethernet) or a wireless network. The various devices of system 100, including 3D scanner 105, computer 120, and 3D printer 150 can be connected via network 130. Examples of computer networks include, but are not limited to, a local area network (LAN), a wide area network (WAN), and the Internet. As shown in FIG. 1, the computer network 130 is a wired network so that devices can communicate, or otherwise transmit, data via physical connections such as Universal Serial Bus (USB) connectors. In some implementations, computer network 130 can be a wireless local area network (WLAN), such as an IEEE 802.n network. Thus, 3D scanner 105 and computer 120, for example, are communicatively coupled, and capable of wireless transmission of scan data via the computer network 130.

The processor 112 can be one or more hardware processors, which can each include multiple processor cores. The memory 114 can include both volatile and non-volatile memory, such as Random Access Memory (RAM) and Flash RAM. The computer 120 can include various types of computer storage media and devices, which can include the memory 114, to store instructions of programs that run on the processor 112.

Such programs can include 3D Scan Processing Software 116, which can run locally on computer 120, remotely on a computer of one or more remote computer systems (e.g., in a third party provider's server system accessible by the computer 120 via the network 130), or on a combination of one or more of each of the preceding. The 3D Scan Processing Software 116 can present a user interface (UI) employed for displaying, or otherwise rendering, a 3D representation, such as digital model 170 on a display device 125 of the computer 120. The display device 125 can be operated using one or more input devices 118 of the computer 120 (e.g., keyboard and mouse or touch screen). Note that while shown as separate devices in FIG. 1, the display device 125 and/or input devices 118 can also be integrated with each other and/or with the computer 120, such as in a tablet computer.

The 3D Scan Processing Software 116 is programmed to analyze, process, and manipulate the scan data (e.g., 2D images, geometric measurements) associated with the scanned object 110, that is generated using scanning techniques employed by 3D scanner 105. The 3D Scan Processing Software 116 can generate a 3D representation, such as digital model 170 that is intended to correspond to the shape, size, and dimensions of the physical object 110. In some implementations, the 3D Scan Processing Software 116 can employ known systems and techniques for generating a 3D representation from 2D images. Additionally, 3D Scan Processing Software 116 can be configured to process and analyze immense amounts of geometric measurements representing the 2D and 3D spatial characteristics associated with object 110 captured using 3D scanner 105.

Also, 3D Scan Processing Software 116 can be programmed to implement the deviation representation, modeling, prediction, and compensation techniques for 3D scanner accuracy according to the embodiments. In an implementation, the Scan Processing Software 116 can be utilized to initiate, and otherwise perform, one or more scanning trials on standard calibration parts using 3D scanner 105. In an implementation, the scanning trials use one or more standard calibration parts of known test objects, where the geometric properties corresponding to the standard calibration parts are known. For example, the objects used during the scanning trials can have standard shapes related to 3D modeling, such as cylinders. Based on the scanning trials, a deviation can be determined after the object 110 has been extracted from the dense point clouds, for example, and modeled in the 3D space. Thus, any shape deviations, or discrepancies, from comparing the corresponding known points of the object's 110 surface geometry and the resulting digital model 170 can be determined. According to the embodiments, the shape deviations measured in the scanning trials can be an indication of the accuracy of 3D scanner 105, and thereby can represent a scanning error associated with the 3D scanner 105. Moreover, the scanning trial can be employed as a calibration technique for the Scan Processing Software 116, for example, that can be further utilized during 3D scan data processing. For instance, the Scan Processing Software 116 can employ information obtained during scanning trials to predict measurement errors for the 3D scanner 105, and perform compensation actions (e.g., adjust digital model) to correct any geometric errors in the digital models generated from 3D scanning. Thus, the embodiments may realize a 3D scanning technique that increases accuracy of a 3D model depiction of the scanned object.

Figure 2:
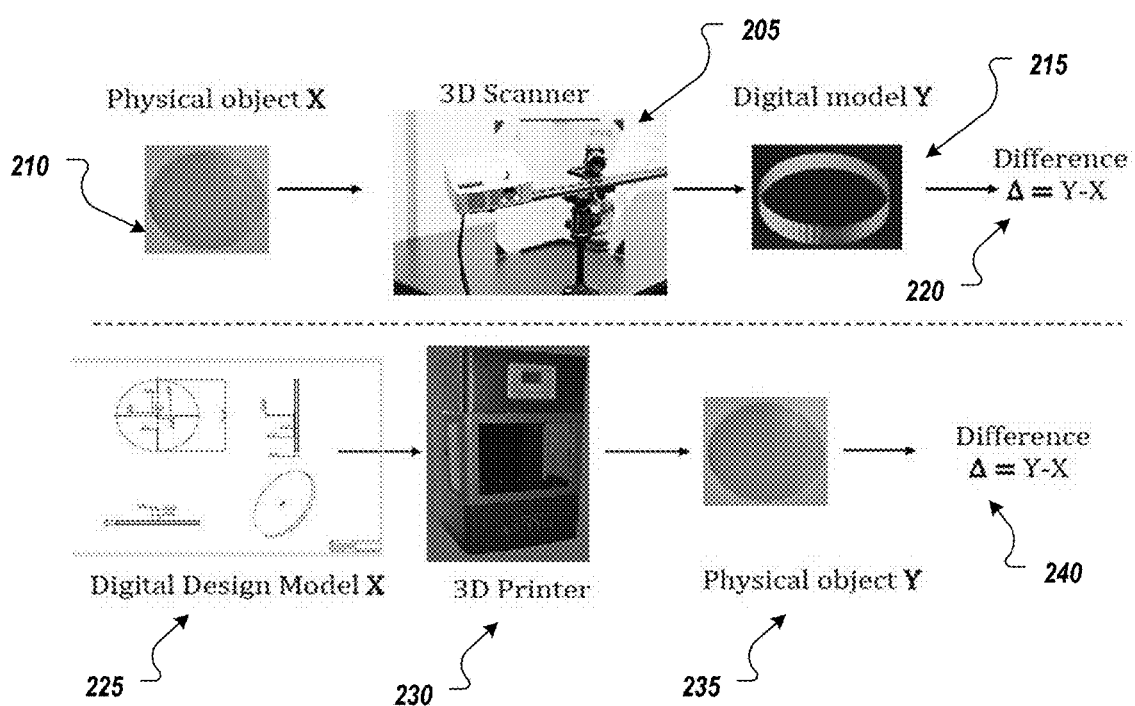
FIG. 2 shows an example of a technique employed for representing geometric discrepancies of digital models in 3D scanning and 3D printing processes.

FIG. 2 shown an example of a technique employed for representing geometric discrepancies of digital models in 3D scanning and 3D printing processes. As illustrated in FIG. 2, the process of 3D printing, implemented by 3D printer 230, for example, can be viewed as the reverse of a 3D scanning process, which can be implemented using a 3D scanner 205. The methodologies established for 3D printing technology are described in detail in U.S. patent application Ser. No. 14/827,956, entitled "STATISTICAL PREDICTIVE MODELING AND COMPENSATION OF GEOMETRIC DEVIATIONS OF 3D PRINTED PRODUCTS", filed Aug. 17, 2015, which is incorporated herein by reference in its entirety. As an example, the 3D printing techniques shown in FIG. 2 can include transmitting a digital design model X 225 to a 3D printer 230. Thereafter, a physical object Y 235, or printer product, can be fabricated by the 3D printer 230. In the 3D printing process, the physical object Y 235 is intended to be a replica (e.g., same dimensions) of an object digitally represented in the digital design model X 225. However, due to material phase change shrinkage that can be experienced during additive layer 3D printing, a difference Δ 240 between the geometric dimensions of the digital design model X and the 3D printed physical object Y 235 can be realized. Thus, the techniques described in the present disclosure apply representation, modeling, and prediction techniques to 3D scanning that have been previously described with compensating for shrinkage experience by 3D printed products. These disclosed systems and techniques further predict 3D scanner accuracy that can be related to geometric discrepancies resulting between an original article and its digitized scan. The predicted discrepancy can be treated as 3D scanner measurement error for later adjustment, or compensation, of the digital model generated using 3D scanning technology.

According to the embodiments, 3D scanner 205 is considered to be associated with certain inaccuracies that can be quantified and modeled. A model can be established to predict the geometric discrepancy between a physical object X 210, and the associated digital model Y 215. These geometric discrepancies can be realized as deviations in shape, dimensions, and various other geometric characteristics between the modeled object and the scanned object. This geometric discrepancy can be represented as a mathematical relationship between the physical object X 210 that has been scanned using 3D scanner 205 and the digital model Y 215. For example, from a quality perspective, predicting the 3D scanner quality can include modeling the difference between the physical object X 210 and digital model Y 215, i.e., $\Delta = Y - X$. The modeling techniques can be applicable to 3D scanner 205 and 3D printing technologies, or vice versa.

In the 3D scanning process, a predictive learning strategy can be established during scanning trials which learns from determining the geometric discrepancy, or difference $\Delta$ 220 realized by a 3D scanner. The learning process can be include using a limited, or known, number of tested shapes. Therefore, the predictive learning strategy can be further employed to derive compensation plans corresponding to 3D scanner 205, for example, that can be used to adjust the digital models of unknown products (e.g., objects not used in scanning trials) to correct for the inaccuracies of the 3D scanner. In 3D scanning techniques, it may be desirable for a 3D scanner 205 to accurately produce a digital model Y 215 that is a substantially exact representation of its physical counterpart, having small or negligible geometric discrepancy $\Delta$ 220. Thus, the embodiments may realize a 3D scanning technique that compensates for 3D scanner error, and reduces shape deviations in digital models. The described strategy can be employed in 3D scanning techniques utilized on a large variety of products having differing and complex geometries. Thus, generating a model for functional dependence of scanning error for a 3D scanner that can be independent of shape complexities can be realized by the embodiments. For example, an in-plane (e.g., 2D) deviation can be significantly reduced for both cylinder and polyhedron shapes by determining and implementing a standard optimal compensation algorithm. Thus, a predictive model for 3D scanner error that is based on in-plane deviation modeling, for example, can be employed for error compensation in the 3D scanning process.

Figure 3:
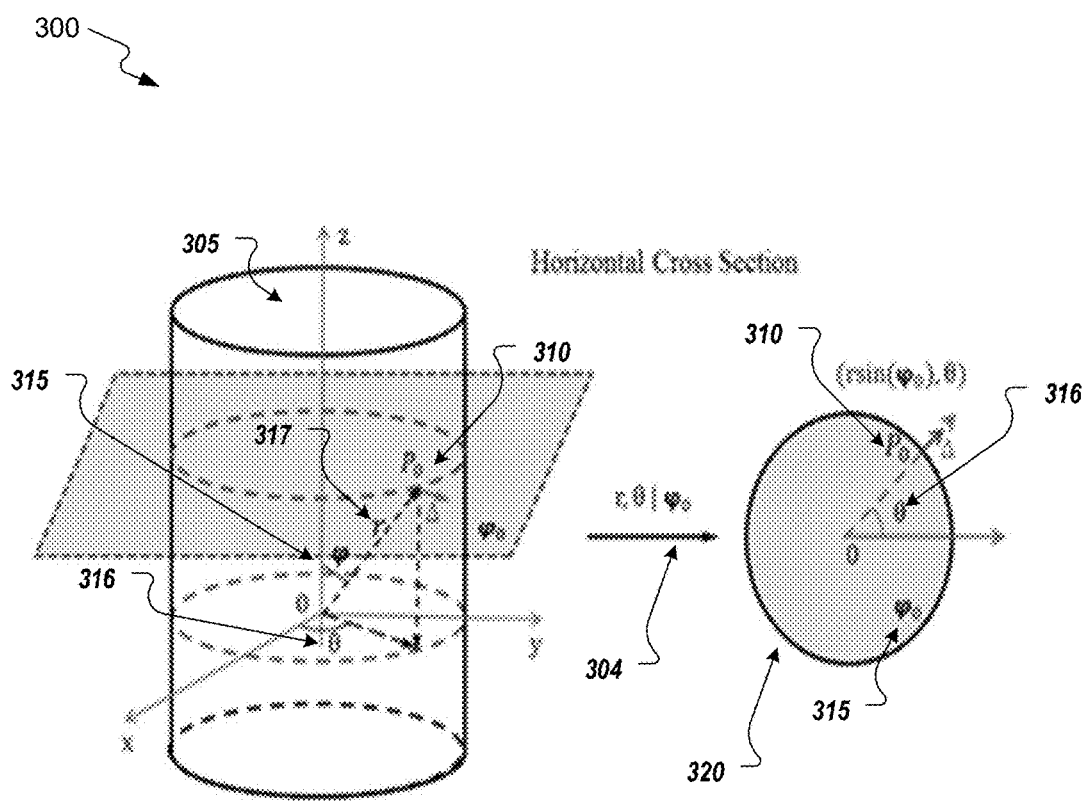
FIG. 3 shows an example of a representation for in-plane shape deviation in a Spherical Coordinate System (SCS).

FIG. 3 shows an example of a representation of in-plane shape deviation in a SCS. The formulation of geometric errors in a 3D scanning process can be unitized for the shape deviation analysis approaches. Also, shape-dependent formulations can be related to a shape-dependent compensation approach employed in the 3D scanning techniques of the embodiments. Moreover, as some 3D scanned objects can have complex shapes, a standard, generic, and shape-independent description of geometric errors can be implemented.

In the embodiments, deriving an optimal compensation technique for scanning error of a 3D scanner uses a consistent formulation for performing both 2D and 3D spatial shape deviation representation. For example, a 3D scanned object can be associated with an intended shape $\psi_0$ and actual shape $\psi$. Deviation can be generally described as $\Delta\psi = \omega - \psi_0$. Once the shape deviations $\Delta\psi$ are presented in a unified formulation, modeling and analysis of geometric errors are greatly alleviated from the original geometric complexity. The shape deviation can be transformed from a Cartesian Coordinates System (CCS) to into a polar coordinates system (PCS) and SCS. Deviation representation and modeling under the PCS is described in detail in U.S. Patent Application No. 62/154,178, entitled "OPTIMAL COMPENSATION ALGORITHM FOR THREE-DIMENSION SHAPE DEVIATIONS IN ADDITIVE MANUFACTURING", which is incorporated herein in its entirety by reference. Additionally, compensation techniques are described in, "An Analytical Foundation for Optimal Compensation of Three-Dimensional Shape Deformation in Additive Manufacturing", which was just recently published; J. Manuf. Sci. Eng 138(6), 061010 (Jan. 12, 2016), which is incorporated herein in its entirety by reference. As shown in FIG. 3 shape deviation representations are also performed in the SCS 300 that can be applied for cylindrical and polyhedron shapes, for example.

The SCS 300 is shown to include spherical coordinate (r, θ, φ) 304, that can be employed to depict both the in-plane and out-of-plane (z direction) deformation in a unified formulation. Spherical coordinates are employed to represent the position of a point, along the surface of a scanned object for example, in a 3D spatial environment. As shown in FIG. 3, the spherical coordinates for depicting an in-plane (e.g., 2D) shape deviation include the radial distance r 317, polar angle θ 316, and the azimuthal angle φ 315. In the embodiments, the technique employed for shape deviation representation facilitates a uniform representation of the out-of-plane error that can be used in the same way to also represent in-plane error. The shape deviation representation technique described can be utilized to realize a broad framework that realizes both in-plane error and out-of-plane error representation in the SCS for the cylindrical shape 305, for example. FIG. 3 illustrates deviation representation in the in-plane instance, where 2D spatial deviation is represented. As an example, $r(\theta, \varphi, r_0(\theta, \varphi))$ is used to denote the boundary shape of a 3D scanned object with $r_0(\theta, \varphi)$ being a nominal shape. As shown in FIG. 3, for an arbitrary point 310 $P_0(r_0\theta_0\varphi_h)$ at a given height $\varphi=\varphi_0$ or $z=r_0(\theta, \varphi)\cos(\varphi_0)$, the horizontal cross-section view 220 of the object passing point 310 $P_0$ is given as $(r_0(\theta, \varphi)\sin(\varphi_0), \theta|\varphi_0)$, whose shape deformation $\Delta r(\theta, r_0(\theta)|\varphi_0)$ represents the in-plane geometric error.

Figure 4:
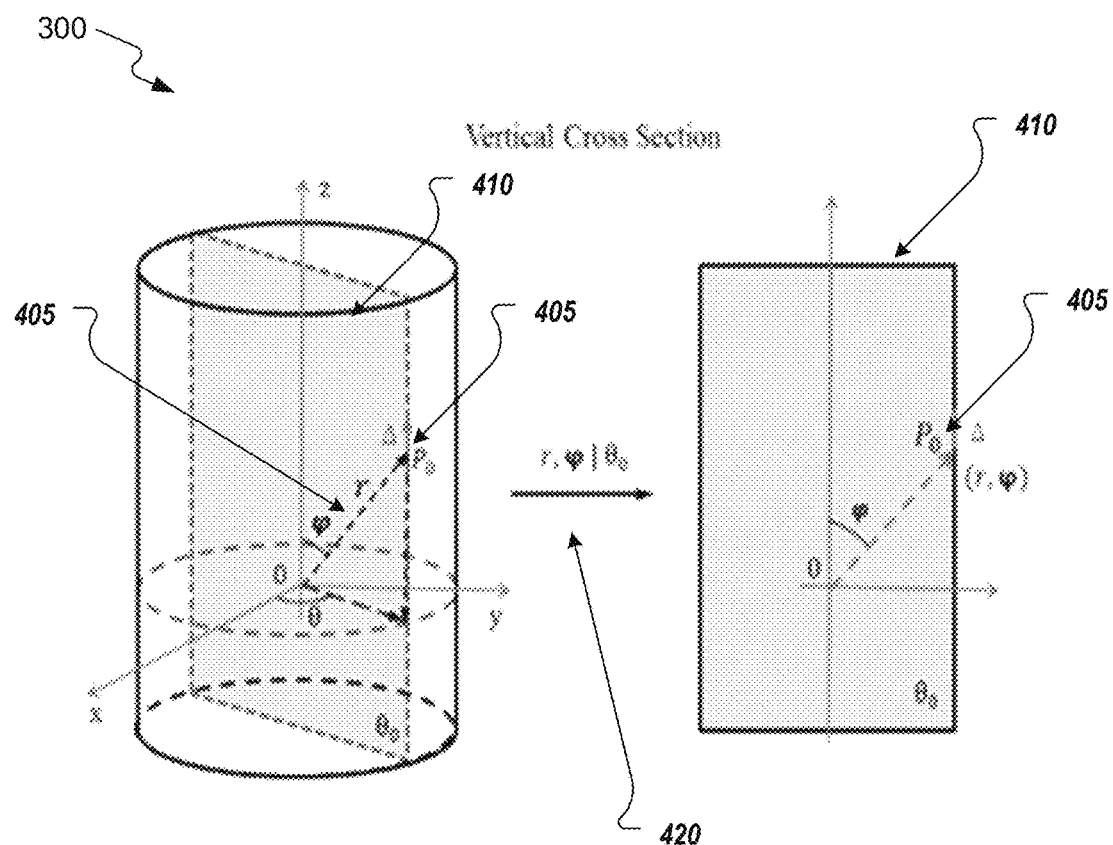
FIG. 4 shows an example of a representation for out-of-plane shape deviation in a SCS.

FIG. 4 shows an example of a representation of out-of-plane shape deviation in the SCS 300. The out-of-plane representation, according to the embodiments, can be employed for representing shape deviations in the 3D spatial environment. In the out-of-plane error case, as illustrated in FIG. 4, the error can be in the vertical direction (e.g., parallel to the z axis), and therefore can be represented in the vertical cross section containing point $P_0$ 405. For example, point $P_0$ 405 can be any point on the boundary of the vertical cross section 410 which is shown as $(r, \varphi|\theta_0)$ 420. Here, as an example, the out-of-plane deviation model is $\Delta r(\varphi, r_0(\theta, \varphi)|\theta)$ as $v(r, \varphi|\theta)$.

Mathematically, modeling of $v(r, \varphi|\theta)$ is essentially equivalent to modeling of $h(r, \theta|\varphi)$. This suggests that the mathematic formulation developed for the in-plane errors, as shown in FIG. 3, can be used in the SCS. Thus, 3D geometric errors can be described in a unified framework. The 3D error of a point Po 405, on the boundary can be decomposed in two orthogonal components: in-plane and out-of-plane errors. The representations of shape deviation can provide a consistent mathematical formulation of errors in 2D (x-y plane) and the 3D (x-y-z plane) space, which can realize ease of incorporation into predictive modeling and compensation in 3D scanning processes.

In the implementations, the shape deviations represented according to the techniques described relating to FIGS. 3-4 can represent geometric errors as a functional surface. For example, the functional surfaces can be defined on an interval, or cross section, of the SCS corresponding to two angular location variables. Furthermore, these representations of shape deviations, as illustrated in FIGS. 3-4, can be employed to generate a model of the functional dependence of scanning error for the 3D scanner. Predictive modeling for 3D scanner error, using the shape deviations, can include a physically consistent approach to model and predict (x-y) plane and/or (x-y-z) plane shape deviation along a product boundary and thus derive optimal compensation plans. The modeling approach can further include decoupling geometric shape complexities experienced in 3D scanning, for example, from the modeling by transforming in-plane geometric errors from CCS into a functional profile defined in the PCS, for example. Connecting cylindrical shape models to polyhedron models, for example, can involve treating in-plane polygons as being cut from its circumcircle. A basis model for the predictive error model, can be employed in a cylindrical shape. Thus, a cookie-cutter function can be applied to perform the connection from the base model to other shapes, which includes adding the cookie-cutter function to the cylindrical basis in order to carve out a polygon shape, for example.

In the implementations, the cookie-cutter function can be a periodic waveform in which the amplitude alternates at a steady frequency between fixed minimum and maximum values. According to the embodiments, cookie cutter functions employed in modeling techniques can include a square wave model and a sawtooth wave model, for example. Thus, an optimal compensation algorithm can be applied to the reduce shape deviation modeled using shapes defined using the cookie-cutter function. Moreover, the techniques described are not limited to established shapes such as cylindrical and polyhedron shapes; the modeling techniques can be extended to include freeform functional representations for modeling arbitrary shapes. For example, a polygon approximation can be utilized in freeform predictive modeling. Details of freeform techniques are described in detail in U.S. Patent Application No. 62/154,178, entitled "OPTIMAL COMPENSATION ALGORITHM FOR THREE-DIMENSION SHAPE DEVIATIONS IN ADDITIVE MANUFACTURING", which is incorporated herein in its entirety by reference.

Figure 5:
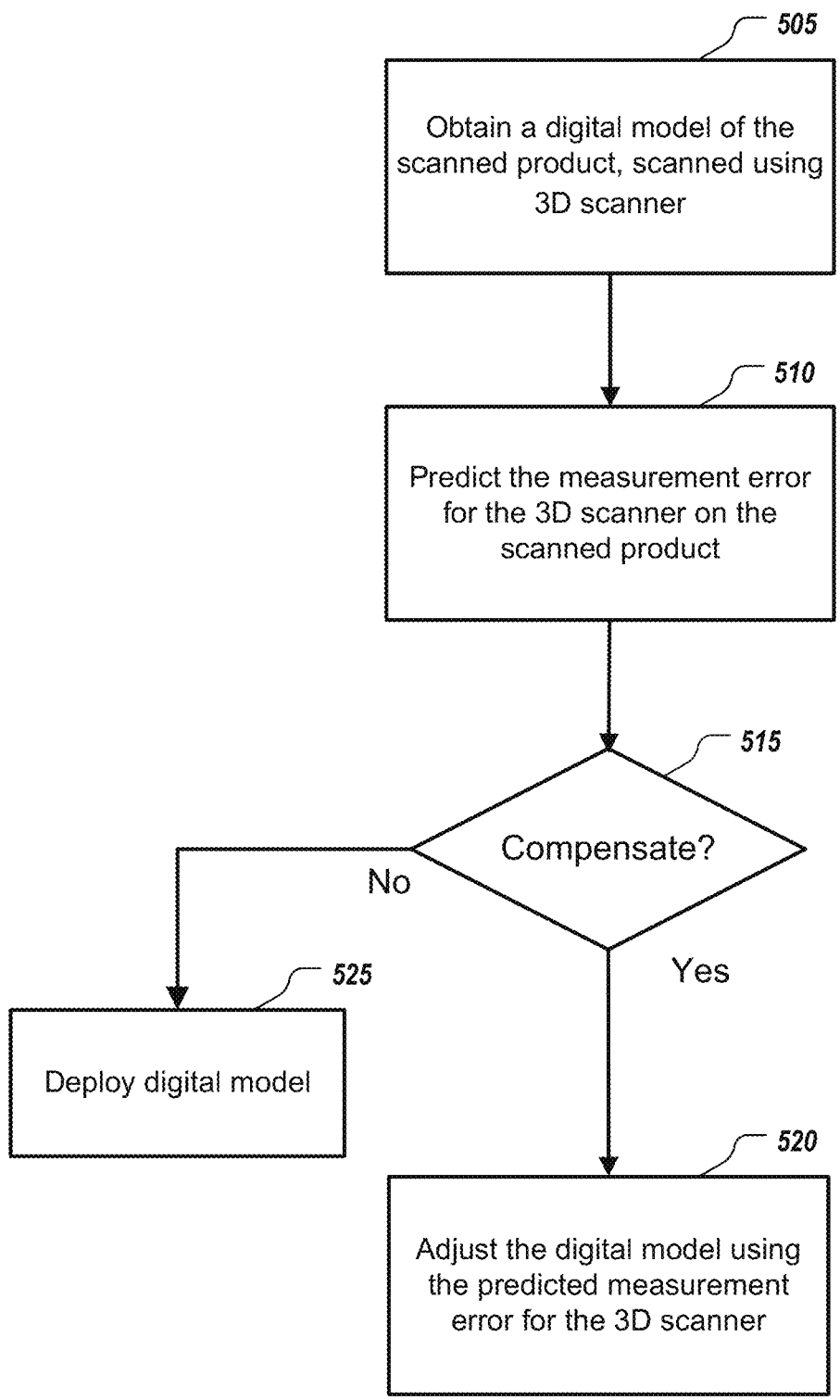
FIG. 5 shows an example of a process employed in compensating for the measurement error for a 3D scanner.

FIG. 5 shows an example of a process employed in compensating for measurement error for a 3D scanner. A digital model of a scanned product can be obtained 505 from a 3D scanner, for example. The obtained digital model can be generated from the 3D scanning techniques as discussed relating to FIG. 1. The digital model can be a digital representation of the scanned product, and can include a shape deviation, or geometric discrepancy, from the original product scanned using the 3D scanner. The deviation can be unintended changes in the geometric characteristics of the digital model that can be associated with various inaccuracies related to the 3D scanner. For example, an obtained digital model can have a larger volume than the scanned product, due to light noise experienced by the 3D scanner during the scanning process.

Thereafter, predicting a measurement error for the 3D scanner 510 on the scanned object can be performed. The predicting can include employing a model of the functional dependence of scanning error for the 3D scanner. The model used during prediction can be generated from the modeling techniques as discussed relating to FIGS. 3-4. The model can be applied to predict one or more geometric discrepancies in 3D modeling that can be attributed to the 3D scanner, and may be realized in the obtained digital model. Thus, predicting 3D measurement error, according to the embodiments, may eliminate a need for performing additional measurements or error analysis on digital models for each newly scanned product, as the prediction is based on previously modeled deviations, for example deviation models generated during the scanning trial process.

A check 515 can be made to determine if compensating for the predicted measurement error is desirable. In some implementations, compensating for any geometric discrepancies generated by the 3D scanner is always sought. Alternatively, it may be desirable for the 3D scanning process to not perform corrective actions to compensate for 3D scanner error, which is represented in FIG. 5 as "No". Subsequently, the generated digital model, which can include some geometric discrepancies from the scanned product can be deployed 525 to additional downstream processing without further adjustments. For instance, in some 3D printing environments, efficiency and speed associated with fabricating scanned products can be more important than accuracy of the 3D model. Accordingly, any errors associated with the 3D scanner may be tolerable, and the digital model can be deployed to a 3D printing device, for example. Deploying the digital model can involve transmitting, or otherwise communicating, the digital model to additional mechanisms and/or devices used in applications of 3D scanning, such as 3D printing, 3D archiving, and inspection.

Alternatively, if it is desired to compensate for the predicted measurement error for the 3D scanner, shown in FIG. 5 as "Yes", the process proceeds to adjusting the digital model 520 using the predicted measurement error for the 3D scanner. Adjusting the digital model can include applying compensation that has been determined to reduce, or otherwise cancel out, deviation between the digital model and its intended shape. For example, adjusting can include applying further calculations to the scan data obtained by the 3D scanner, so as to produce corrected, or new measurements employed in regenerating the model. In some implementations, compensation actions can be performed on the obtained digital model, such as a shrinking effect, rather than regenerating the model. The compensation measurements used to adjust the digital model may be equivalent to the quantified geometric error of the 3D scanner, for example. Additionally, in some implementations adjusting can include applying an optimal amount of compensation needed for an accepted, or minimal, amount of deviation. Accordingly, adjusting the digital model can involve determining an optimal compensation algorithm for the scanning error of a 3D scanner. Moreover, in some embodiments, a digital model can be preemptively adjusted to correct for predicted measurement errors for a 3D scanner. Accordingly, 3D scanning software, for example, may apply compensation calculations to all scan data obtained by the 3D scanner used to generate digital scan. Thus, the embodiments may realize improved accuracy in 3D scanning techniques by utilizing compensation, and thereby reducing measurements errors for a 3D scanner.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method performed by a computer system comprising processor electronics and at least one memory device, the method comprising:
    obtaining data regarding (i) standard calibration parts with shapes comprising cylinders and polyhedrons, and (ii) one or more scanning trials performed on the standard calibration parts using a three dimensional (3D) scanner;
    comparing the data to find shape deviations for the standard calibration parts in a coordinate system;
    generating a model of functional dependence of scanning error for the 3D scanner using the shape deviations, wherein the model includes a first function base representing the shape deviations of cylindrical shape, and a second function representing a cookie-cutter model connecting the cylindrical shape with one or more different shapes; and
    providing the model of functional dependence of scanning error for the 3D scanner to quantify scanning inaccuracy of the 3D scanner, wherein the model is usable to predict a measurement error for the 3D scanner on a scanned product.

2. The method of claim 1, wherein obtaining the data regarding the one or more scanning trials comprises:
    taking photographic images of a standard calibration part from different angles using the 3D scanner; and
    fusing the photographic images together to generate a digital model of the standard calibration part.

3. The method of claim 1, wherein generating the model of functional dependence of scanning error for the 3D scanner comprises extracting location-independent shape deviation pattern and location-dependent shape deviation pattern for the cylindrical base function.

4. The method of claim 1, wherein generating the model of functional dependence of scanning error for the 3D scanner comprises using a cookie-cutter model to trim a polygon from a cylinder.

5. The method of claim 4, wherein generating the model of functional dependence of scanning error for the 3D scanner comprises using a library of cookie-cutter models including a square wave model and a sawtooth wave model.

6. The method of claim 1, comprising:
    obtaining a digital model of the scanned product, which has been scanned using the 3D scanner;
    predicting the measurement error for the 3D scanner on the scanned product using the model of functional dependence of scanning error for the 3D scanner to predict geometric discrepancies generated by the 3D scanner; and adjusting of the digital model using the predicted measurement error for the 3D scanner on the scanned product.

7. The method of claim 1, wherein generating the model of functional dependence of scanning error for the 3D scanner comprises using a Polar Coordinate System (PCS) in which each of the shape deviations represents geometric errors in a plane as a functional profile defined on an interval of the PCS corresponding to an angular location variable.

8. The method of claim 1, wherein the cookie-cutter model connecting the cylindrical shape with one or more different shapes extends the first function base to a freeform for arbitrary shapes.

9. The method of claim 1, wherein generating the model of functional dependence of scanning error for the 3D scanner comprises using a Spherical Coordinate System (SCS) in which each of the shape deviations represents geometric errors as a functional surface defined on an interval of the SCS corresponding to two angular location variables.

10. A method performed by a computer system comprising processor electronics and at least one memory device, the method comprising:
    obtaining data regarding (i) standard calibration parts with shapes comprising cylinders and polyhedrons, and (ii) one or more scanning trials performed on the standard calibration parts using a three dimensional (3D) scanner;
    comparing the data to find shape deviations for the standard calibration parts in a Polar Coordinate System (PCS), wherein each of the shape deviations represents geometric errors as a functional profile defined on an interval of the PCS corresponding to an angular location variable;
    generating a model of functional dependence of scanning error for the 3D scanner using the shape deviations, wherein the model includes a first function base representing the shape deviations of cylindrical shape, and a second function representing a cookie-cutter model connecting the cylindrical shape with one or more different shapes; and
    providing the model of functional dependence of scanning error for the 3D scanner to quantify scanning inaccuracy of the 3D scanner, wherein the model is usable to predict a measurement error for the 3D scanner on a scanned product.

11. The method of claim 10, wherein obtaining the data regarding the one or more scanning trials comprises:
    taking photographic images of a standard calibration part from different angles using the 3D scanner; and
    fusing the photographic images together to generate a digital model of the standard calibration part.

12. The method of claim 10, wherein generating the model of functional dependence of scanning error for the 3D scanner comprises extracting location-independent shape deviation pattern and location-dependent shape deviation pattern for the cylindrical base function.

13. The method of claim 10, wherein generating the model of functional dependence of scanning error for the 3D scanner comprises using a cookie-cutter model to trim a polygon from a cylinder.

14. The method of claim 13, wherein generating the model of functional dependence of scanning error for the 3D scanner comprises using a library of cookie-cutter models including a square wave model and a sawtooth wave model.

15. The method of claim 1, comprising:
    obtaining a digital model of the scanned product, which has been scanned using the 3D scanner;
    predicting the measurement error for the 3D scanner on the scanned product using the model of functional dependence of scanning error for the 3D scanner to predict geometric discrepancies generated by the 3D scanner; and
    adjusting of the digital model using the predicted measurement error for the 3D scanner on the scanned product.

16. The method of claim 15, wherein adjusting of the digital model comprises determining an optimal compensation algorithm for scanning error of a 3D scanner.

17. A system comprising:
    a three-dimensional (3D) scanner; and
    one or more computing devices coupled with the 3D scanner and programmed to (i) obtain data regarding (a) standard calibration parts with shapes comprising cylinders and polyhedrons, and (b) one or more scanning trials performed on the standard calibration parts using the three dimensional (3D) scanner; (ii) compare the data to find shape deviations for the standard calibration parts in a coordinate system; (iii) generate a model of functional dependence of scanning error for the 3D scanner using the shape deviations, wherein the model includes a first function base representing the shape deviations of cylindrical shape, and a second function representing a cookie-cutter model connecting the cylindrical shape with one or more different shapes; and (iv) provide the model of functional dependence of scanning error for the 3D scanner to quantify scanning inaccuracy of the 3D scanner, wherein the model is usable to predict a measurement error for the 3D scanner on a scanned product.

* * * * *